Aug. 15, 1939.  M. J. NIEDERLEHNER  2,169,613
PISTON RING
Filed April 5, 1937

INVENTOR
Milton J. Niederlehner
BY
Wood & Wood
ATTORNEYS

Patented Aug. 15, 1939

2,169,613

UNITED STATES PATENT OFFICE 2,169,613

PISTON RING

Milton J. Niederlehner, Cincinnati, Ohio, assignor to Victor F. Zahodiakin, New York, N. Y.

Application April 5, 1937, Serial No. 135,022

3 Claims. (Cl. 309—45)

This invention relates to piston rings of the type adapted for use in the pistons of internal combustion engines or for similar purposes where the control of lubricating oils and the maintenance of compression are of paramount importance.

It is desirable that the metal of the piston rings be hardened for increasing the durability and life thereof. However, it has been found that if the piston ring of conventional type is too hard, it tends to wear the cylinder wall too rapidly, since the cylinder block is usually made of cast iron. The conventional ring provides sharp external circumferential edges which scrape the cylinder wall.

It is the objective of the present invention to provide a hardened piston ring the shape of which is such that excessive wear of the cylinder bore cannot take place. In view of the present conception, it has been possible to make the metal of the piston rings considerably harder than the metal of the cylinder block.

In arriving at the present invention it has been recognized that it is impossible to maintain the contacting surfaces of the piston rings in true parallel relation to the cylinder walls. This is due to the fact that a clearance must be provided to accommodate for the great thermal changes taking place in the internal combustion engine. For this reason the present ring provides that, even though the angular position of the ring be varied, that is, if tipping or canting takes place, abnormal wear will not take place on the softer metal of the cylinder walls.

Other objects and certain advantages will be more fully apparent from a description of the accompanying drawing, in which.

Figures 1, 2:
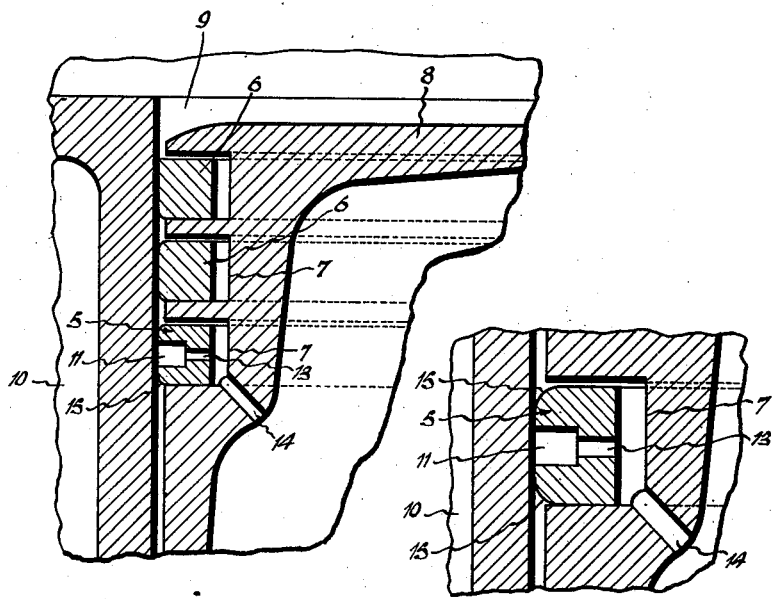
Figure 1 is a fragmentary sectional view of a portion of a cylinder block and a portion of a piston showing the improved piston rings in position.
Figure 2 is an enlarged fragmentary view of the oil control ring.
Figure 3:
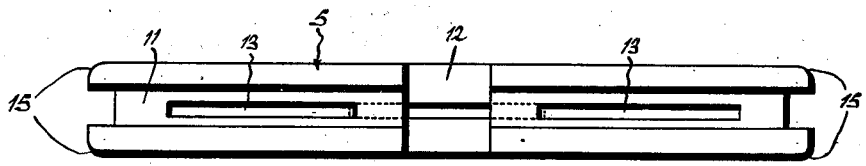
Figure 3 is a side elevation of the ring removed from the piston.

Generally speaking, a structural embodiment of the invention consists of a ring which has its upper and lower edges rounded entirely around the circumference of the ring. The ring is harder than the rings which have been in use up to the present time. For example, the material of the ring may be a hardened, high carbon steel. Further, the improvement may reside entirely in the shape of the ring since this shape may be applied to the conventional cast iron ring.

The drawing illustrates piston rings, that is oil control and compression rings which are of conventional shape; that is with respect to the oil grooves, the splits, and the cross sections, except as noted hereinafter. For the purpose of identification, the oil control ring is generally indicated at 5, and the compression rings at 6. These rings are mounted in grooves 7 of the piston 8, which slides in the cylinder bore 9 of the cylinder block 10. The oil control ring 5 is circumferentially grooved, as at 11, and includes a split 12. Radially disposed slots 13 connect the circumferential groove 11 with the inner wall of the ring. The radially disposed slots 13 receive the excess oil scraped from the cylinder wall by the sharp internal edges of grooves 11. The oil removed from the cylinder wall passes through these grooves into the groove 13 containing the oil control ring and thence to the interior of the piston through passageways 14.

The upper and lower edges of the oil control ring and the lower compression ring are rounded as at 15. The radii of these edges are relatively large (see the detailed view of Figure 2).

As stated, the rings may be formed of a high carbon steel. This high carbon steel is heat treated in the following manner: First of all, the metal is heated to a temperature between 1450° F. and 1500° F. and is then quenched in oil. It is then reheated in oil to a temperature of between 400° F. and 500 F. from five to ten minutes and then removed. This process of course is exemplary. In general, it may be said that the high carbon steel is hardened to a much greater hardness than the metal of the cylinder block. Due to the fact that there are no sharp edges to dig in or gouge the walls of the cylinder, there is no increase in the wear of the cylinder bore.

After it is heated and quenched in oil or water, the high carbon steel becomes hard and brittle and may require reduction or mitigation. By the proper regulation of the time and temperature and by reheating at lower temperatures, this brittle condition is eliminated. The desired hardness is preserved and the strain which has been set up by the hardening quench will be relieved. In the heating and quenching operation the ring should be held by form plates so that it will not become distorted and so that the circumference and flat formation of the same will be correctly maintained.

The ring thus formed is exceedingly hard, and it may be described aptly as being hard enough to cut glass. It will be understood that the expression glass cutting hardness is intended to express a degree of hardness resulting from a method such as that described in this application or its equivalent.

Having described my invention, I claim:

1. A piston ring, said ring having flat upper and lower surfaces and a flat external contact surface, said ring having its upper and lower external edges rounded on radii providing curvatures which are tangential, respectively, to the upper surface and the external contact surface and the lower surface and the external contact surface, said external contact surface including oil passageways, the edges of which lie within the flat extent thereof, said ring formed of steel of glass hardness.

2. A piston ring, said ring having a flat external contact surface, said ring having its upper and lower external edges rounded on radii providing curvatures which are tangential respectively to the upper surface of the ring and the flat external contact surface and the lower surface of the ring and the external contact surface, said external surface including oil passageways, said passageways being disposed in the flat portion of the external contact surface and arranged so that there are portions of the flat surface above and below the oil passageways, said ring formed of steel which is heat treated to a hardness sufficient for cutting glass.

3. A piston ring, said ring having a flat external surface adapted to contact the wall of a cylinder, said ring having its upper and lower external edges rounded on radii providing curvatures which are tangential respectively to the flat external contact surface, said external surface including an oil passageway, said passageway being disposed in the flat external contact surface and arranged so that there are portions of the flat surface above and below the oil passageway, said ring formed of steel which is heat-treated to a hardness sufficient for cutting glass.

MILTON J. NIEDERLEHNER.